United States Patent
Simmons

(10) Patent No.: US 9,701,577 B1
(45) Date of Patent: Jul. 11, 2017

(54) ELECTRIC PRIVACY GLASS AND RESIN USED THEREIN

(71) Applicant: AP Technologies, New Albany, OH (US)

(72) Inventor: Donn Simmons, Clarksburg, OH (US)

(73) Assignee: AP TECHNOLOGIES, New Albany, OH (US)

( * ) Notice: Subject to any disclaimer, the term of this patent is extended or adjusted under 35 U.S.C. 154(b) by 172 days.

(21) Appl. No.: 14/183,692

(22) Filed: Feb. 19, 2014

Related U.S. Application Data

(60) Provisional application No. 61/769,557, filed on Feb. 26, 2013.

(51) Int. Cl.
  *G02F 1/1333* (2006.01)
  *C03C 17/32* (2006.01)
  *B29D 11/00* (2006.01)

(52) U.S. Cl.
  CPC ...... *C03C 17/322* (2013.01); *B29D 11/00634* (2013.01); *G02F 1/133365* (2013.01)

(58) Field of Classification Search
  CPC .... G02F 1/03; G02F 17/322; G02F 1/133365; B29D 11/00634
  USPC ...................................................... 349/86–94
  See application file for complete search history.

(56) References Cited

U.S. PATENT DOCUMENTS

| 7,652,098 B2 | 1/2010 | Yamaguchi et al. |
| 2003/0193709 A1* | 10/2003 | Mallya ............... G02F 1/1334 359/245 |

FOREIGN PATENT DOCUMENTS

| CN | 102532773 | 7/2012 |

* cited by examiner

Primary Examiner — Charles Chang
(74) Attorney, Agent, or Firm — Perkins Coie LLP

(57) ABSTRACT

An electric privacy glass having a first lite of glass with a low-emissivity coating formed using a pyrolytic process on at least one major surface and a second lite of glass with a low-emissivity coating formed using a pyrolytic process on at least one major surface is provided. The first and second lites of glass are each coated with a resin on the major surfaces having the low-emissivity coating. The first and second lites of glass are stacked such that the low-emissivity coatings are facing each other with the resin therebetween. The electric privacy glass has pressure sequentially applied. The resin in cured to adhere the first and second lites of glass. The resin can include a liquid crystal polymer and a UV-curable acrylate polymer. The UV-curable acrylate polymer can include an acrylate urethane oligomer, a high boiling point methacrylate, an acrylic acid, and a photocuring agent.

10 Claims, 2 Drawing Sheets

ELECTRIC PRIVACY GLASS AND RESIN USED THEREIN

PRIORITY

The present application claims priority to U.S. Provisional Patent Application Ser. No. 61/769,557, filed Feb. 26, 2013, titled Electric Privacy Glass and Resin Used Therein, the disclosure of with is incorporated herein by reference as if set out in full.

BACKGROUND

"Switchable glass" is an industry term for glass that can be switched back and forth between an opaque or translucent state to a clear transmissive or transparent state by the application of electricity. This product is also commonly referred to as electric privacy glass.

The glass industry has long desired a useful, inexpensive, and easy to produce version of electric privacy glass. However, the industry has not yet been able to provide a product that is feasible to produce or that has the strength and longevity characteristics demanded by customers and regulatory boards. For example, existing products tend to be expensive, such as in the range of from $100 to $200 per sq. ft. and typically carry a maximum warranty of 1 year. As a result, currently available products tend to be relegated to a small niche of specialty architectural projects.

Existing electric privacy glass products are typically made using the same general process and materials. To begin with, a thin film of metallic coating is sputter coated on a sheet of Mylar film. A liquid crystal and epoxy mixture is then roller coated on to the coated Mylar film. The composite film is then glued between two pieces of glass using urethane glue.

Several problems exist with this method and product. First, it is expensive to sputter a metallic coating on Mylar. Second, the metallic coating on the Mylar film is amorphous, meaning it does not want to stick to the Mylar film. This means that when the glass pieces are glued together with the Mylar film placed therebetween, a very weak bond is formed because the liquid crystal-epoxy mixture and the urethane glue holding the glass together are bonded to the metallic coating which does not have a strong bond to the Mylar film. Also, there is an inherent problem with using a mixture of liquid crystal and epoxy, Mylar film, and glass together due to their different rates of expansion under environmental conditions. When exposed to changes in heat, humidity, and UV light, the different materials expand and contract at different rates, resulting in the product delaminating, which results in a product having a relatively short life span. This is part of the reason why current products cannot be given extended product warranties.

SUMMARY

In some embodiments, a resin composition suitable for use in an electric privacy glass is described. The resin can include a liquid crystal polymer and a UV-curable acrylate polymer. The UV-curable acrylate polymer can include an acrylate urethane oligomer, a high boiling point methacrylate, an acrylic acid, and a photocuring agent. In some embodiments, the resin composition includes about 70% liquid crystal polymer and about 30% of the UV-curable acrylate polymer. In some embodiments, the liquid crystal polymer includes E7 liquid crystal mixture.

In some embodiments an electric privacy glass is described. The electric privacy glass can include a first lite of low-emissivity coated glass and a second lite of low emissivity coated glass. Generally, the technology of the present application relates to a low-emissivity or low-e glass formed using a pyrolytic (or hard-coated) process. Between the two lites of glass is a resin that adheres the first lite to the second lite. The resin can include a liquid crystal polymer and a UV-curable acrylate polymer. The UV-curable acrylate polymer can include an acrylate urethane oligomer, a high boiling point methacrylate, an acrylic acid, and a photocuring agent. Each lite is coated on one side, and the coated sides face each other in the finished product such that the resin contacts both the coatings. The first lite and second lite of glass are arranged with the coated surfaces facing each other. Pressure is applied to the first and second lites of glass. In certain embodiments the pressure is supplied sequentially along a longitudinal axis, such as, through pinch roller for example. The pressure applied squeezes out any trapped air pockets, which pockets are detrimental to the performance of the glass. UV light can be used to cure the resin and, together with the applied pressure, facilitates adherence of the two lites together. Electric contacts can be integrated into the electric privacy glass such that an electrical charge can be used to change the state of the electrical privacy glass form an opaque or translucent state to a transparent or transmissive state.

In certain aspects, the resin may be formed with gaps between portions of the resin such that the resin has discrete sections. The sections may be sufficiently small such that the resin is pixilated. Each discrete section may be separately connected to an electrical power supply such that single or groups of sections may be separately controlled to an opaque or transparent state forming a pattern. The electrical supply to each of these sections may be manually controlled or controlled through a processor to sequence the on and off of the device to provide various designs and the like, such as a louver design, a logo, or the like.

The resin and electric privacy glass described herein can provide several advantages over previously known electric privacy glass products. To begin with, the embodiments described herein can eliminate the need for a Mylar. Instead, the resin described herein can be applied in a uniform coating between the two lites of low-e glass to adhere the glass together, and the coating on the glass acts as the electrical conductor. The elimination of the need to sputter coat the Mylar film also represents a significant reduction in cost. The coating on the low-e glass is extremely well bonded to the glass, making the adhesion between the resin described herein and the glass highly durable. Additionally, the resin composition described herein has a uniform expansion rate, giving the final product a durable bond even if exposed to harsher than normal conditions.

BRIEF DESCRIPTION OF DRAWINGS

The accompanying drawing illustrates exemplary embodiments and is a part of the specification. Together with the following description, the drawing demonstrates and explains various principles of the instant disclosure.

Figure 1:
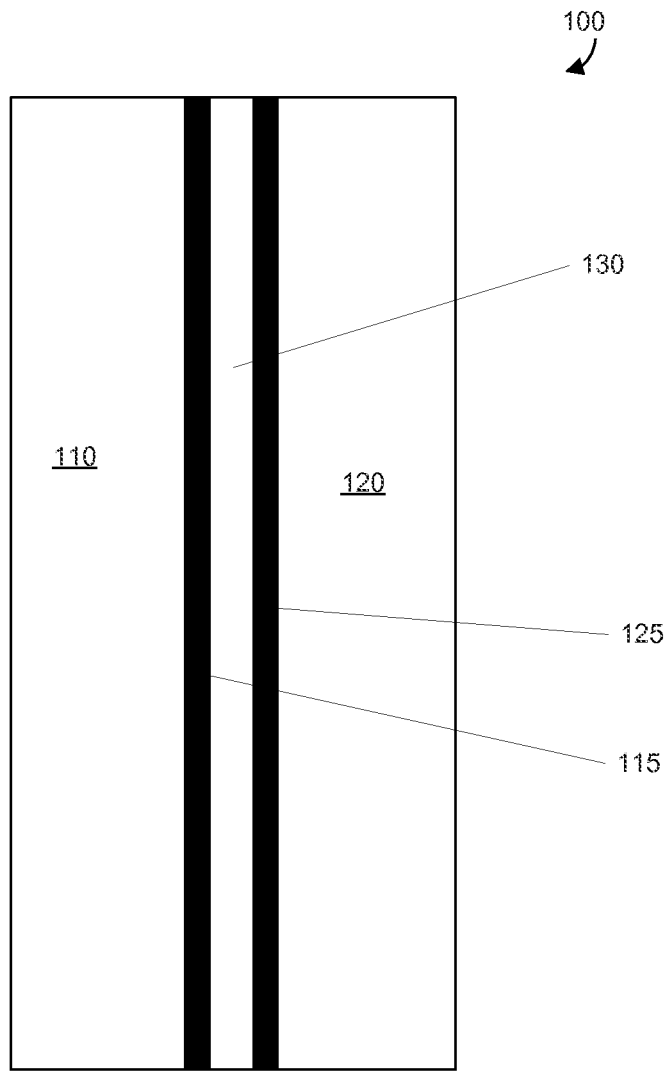
FIG. 1 is an illustration of an electric privacy glass according to various embodiments described herein.

Throughout the drawing, identical reference characters and descriptions indicate similar, but not necessarily identical, elements. While the exemplary embodiments described herein are susceptible to various modifications and alternative forms, specific embodiments have been shown by way of example in the drawing and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

In some embodiments, an electric privacy glass includes a first and second lite of low-emissivity (low-e) coated glass and a resin composition between the two lites of glass that adheres the first lite to the second lite. Generally, the low-e glass, which may be referred to as a pyrolytic low-e glass, is formed using a pyrolytic process. Forming pyrolytic low-e glass is well known in the art and will not be further explained herein except as necessary to facilitate an understanding of the technology of the present application. The resin composition sandwiched between the two lites of glass can be a mixture of liquid crystal polymer and a UV-curable acrylate polymer. The application of an electrical charge to the stack results in the opaque or translucent resin to transition to a transparent state. In this manner, the electric privacy glass can be used in a variety of settings where the ability to switch glass between opaque or translucent to transparent is desirable.

The first and second lites of glass are coated on one or more surfaces in order to make the lites of glass low emissivity glass. Generally, the low-e glass of the present application is a formed using a pyrolytic process, also known as a hard-coat low-e glass. While low-e glass may be formed using a sputter deposition process, as explained above, the low-e glass associated with the technology of the present application is formed using a pyrolytic process. Thus, as used herein, low-e glass and pryolytic low-e glass are used interchangibly. The coating used on the lites of glass can be any coating known to those of ordinary skill in the art for providing low-emissivity characteristics to the glass on which it is coated. In some embodiments, the glass is coated with fluorinated tin oxide using a pyrolytic process in order to provide the glass with low-e characteristics. The coating can have a range of resistivity. In some embodiments, the resistivity of the coating on the lites of glass is about 130 ohms.

In some embodiments, the coating to provide low-e characteristics to the glass is applied on only one of the two main surfaces of each of the lites of glass. For example, as shown in FIG. 1 and described further below, the privacy glass comprises a first lite of glass 110 having a low-e coating 115 on a main surface of the glass and a second lite of glass 120 having a low-e coating 125 on a main surface of the glass are arranged such that the low-e coatings 115/125 are facing each other and separated by a resin 130 that bonds to each of the low-e coatings 115/125. In such embodiments, the electric privacy glass is constructed by having the coated side of each lite of glass face each other when the two lites are adhered together with the resin composition. In this manner, the coated side of each lite of glass is in contact with the resin composition. It has been found that the constructed low-e glass, comprising a stack of the first lite of glass 110, the first low-e coating 115, the resin 130, the second low-e coating, and the second lite of glass 120 may have pressure applied sequentially along the length or longitudinal axis of the stack to force entrapped air out, which entrapped air may be detrimental to performance of the privacy glass.

The dimensions of each lite of glass are generally not limited. In some embodiments, the dimensions of each lite of glass are the same, including the length and height, so that the edges of the lites of glass can be aligned when the lites of glass are adhered to each other using the resin composition. In some embodiments, the dimensions of the lites of glass used can be up to 60"×120", although larger and smaller sizes can be used also. The lites of glass may be clear, colored, or tinted. Thus, the technology of the present application includes both clear glass as well as tinted and colored glass.

In some embodiments, the lites of glass are notched to allow for electrical contacts to be placed inside of the electric privacy glass. In some embodiments, the electrical contacts are positioned on the coated side of the lite of glass. Electrical contacts are provided so that an electrical charge can be applied to the electric privacy glass, which results in the transformation between an opaque or translucent state to a transparent state. The contacts are generally situated at opposing edges of the glass lite to create a circuit across the coated surface of the glass. For glass that has been etched, contacts are placed on each portion of the graphic to be controlled electrically.

The resin composition can generally include two main components. The first is a UV-curable acrylate polymer. The second is a liquid crystal polymer. The two components are mixed together at a specific ratio to provide a resin composition that is capable of both adhering with the low-e lites of glass when cured and switching between an opaque or translucent state to a transparent state upon the application of an electrical charge. In some embodiments, the resin composition includes about 30 wt % UV-curable acrylate polymer and about 70 wt % liquid crystal polymer. In addition to providing a resin capable of adhering to the lites of glass and switching between an opaque or translucent state to a transparent state, the ratio of the two components in the mixture described above provides a resin having a viscosity well suited for uniform application to the lites of glass, which improves the manufacturing process of the electrical privacy glass. In some embodiments, the viscosity of the resin composition is similar to that of a light gel.

The liquid crystal polymer used in the resin composition can include any type of liquid crystal polymer known by those of ordinary skill in the art to be suitable for use in electric privacy glass. In some embodiments, the liquid crystal polymer is E7 liquid crystal mixture, which is a liquid crystal mixture including several cyanobiphenyls with long aliphatic tails, and which is typically used commercially in liquid crystal displays.

The UV-curable acrylate polymer can include several components. In some embodiments, the UV-curable acrylate polymer includes an acrylate urethane oligomer, a high boiling point methacrylate, acrylic acid, and a photocuring agent. In some embodiments, the components are present in the following amounts:

acrylate urethane oligomer: less than 60 wt %
high boiling point methacrylate: more than 20 wt %
acrylic acid: less than 10 wt %
photocuring agent: less than 10 wt %

The high boiling point methacrylate generally includes methacrylic acid and derivatives thereof, including salts, esters, and polymers of these species.

The photocuring agent can include any type of photocuring agent known to those of ordinary skill in the art for assisting in curing a composition upon exposure to UV light. In some embodiments, the photocuring agent is 1-Hydroxycyclohexyl phenyl ketone.

The resin composition is generally opaque or translucent in both a pre-cured and a post-cured state. However, as described above, the application of an electrical charge to the resin composition can result in the order of the liquid crystal polymer such that the resin composition turns transparent. The removal of the electrical charge will result in the liquid crystal polymer becoming disordered and return to the composition to the opaque or translucent state. When the resin composition is used between the two lites of glass, the stack will become opaque or translucent due to the presence of the resin between the two glass pieces. When an electric charge is applied, the stack becomes transparent, as the resin composition switches to a transparent state and a user can thus see through both lites of glass and the resin composition sandwiched therebetween.

FIG. 1 provides an illustration of the electric privacy glass according to embodiments described herein. The electric privacy glass 100 includes a first lite of glass 110, a second lite of glass 120, and a resin composition 130 disposed between the two lites of glass. While shown as a single layer, resin composition 130 may in fact comprise a first layer coated on the first lite of glass 110 and a second layer coated on the second lite of glass 120. Each lite of glass 110, 120 also includes a low-e coating 115, 125. In the assembled configuration, the low-e coatings 115, 125 face inward and towards each other, or facing across the resin layer 130. In this manner, the low-e coatings 115, 125 are in contact with the resin composition 130. Thus, as can be appreciated, the resin coated on the first lite of glass 110 is, as shown in FIG. 1, coated on the low-e coating 115, and the resin coated on the second lite of glass 120 is, as shown in FIG. 1, coated on the low-e coating 125. The stack shown in FIG. 1 may have pressure applied sequentially along the length (or width) using, for example, pinch rollers to squeeze or pinch entrapped air out of the stack. The resin composition is exposed to UV light to cure the composition and bond the first lite 110 to the second lite 120 forming the electric privacy glass 100.

In some embodiments, the operating specifications of the electrical privacy glass are as follows:

Operating Voltage: 50-100 vac
Operating Current: 0.6 ma/sq ft.
Operating Frequency: 50-60 Hz
Operating Temperature Range: −10 deg C. to 61 deg C.

In some embodiments, the electric privacy glass can be configured such that varying levels of transparency can be obtained. In some embodiments, this can be achieved by varying the amount of electrical charge applied. When smaller electrical charges are applied, the degree of transparency achieved is less. When larger electrical charges are applied, the level of transparency achieved can be near 100%. In some embodiments, the electrical privacy glass also can be configured such that the transfer from an opaque or translucent state to a transparent state (or vice versa) can occur in a "louvered" fashion. The electrical privacy glass described herein can also be configured such that portions or segments of the glass transition between a translucent or opaque state to a transparent state independent of other portions or segments of the glass. In this manner, various designs can be made to appear in the glass, such as corporate logos where the logo remains opaque and the surround area turns transparent (or vice versa). In some embodiments, associated programming can be used with a pixilated version of the electric privacy glass so that different designs can be programmed into the system and a single pane of electric privacy glass can be used to show different designs on demand.

Various methods can be used to fabricate the electric privacy glass described herein. In some embodiments, the method can begin with providing stock sheet sizes of low-e glass. Stock sheet sizes may be used because the finished electric privacy glass can be cut to size and using stock sheet sizes can reduce the cost of manufacture and improve production efficiency and yield. In other embodiments, the low-e glass is cut to size as an initial step and prior to manufacturing the stack. The low-e glass provided in the initial step can be similar or identical to the low-e glass described in greater detail above.

After the low-e glass has been provided, the manufacturing process can be carried out in a generally horizontal assembly. The low-e glass sheets can be washed in accordance with low-e manufacturing recommendations. Washing typically calls for the low-e coated surface to be the top surface while the lower surface is washed by horizontal washer rollers. In this manner, potential damage to the low-e coated surface is minimized.

In a next step, the resin composition is coated on a first lite of low-e coated glass, on a second lite of low-e coated glass, or both. The resin composition can be applied to the top surface of a horizontally positioned first, second, or both lites of low-e glass. In some embodiments, the first, second, or both lites of low-e glass are positioned so that the top or facing surfaces are the low-e coated surfaces. Any method of applying the resin composition can be used, include hand brushing or using a reverse roll coater. The resin composition can be applied to the entire surface of the first, second, or both lites of low-e glass, although partial coatings can also be used.

After the resin composition is applied to the low-e coated surfaces of the first, second, or both low-e surfaces of the lites of glass, the lites of glass are stacked or placed one on top of the other. In some embodiments, the second lite of glass is disposed on the first lite of glass such that the coated low-e side is facing down. In this manner, the resin spread on the first lite of glass will be in contact with the resin on the second lite of glass. In certain embodiments, the resin may be coated on one lite of glass such that when the other lite of glass is arranged on the stack, the resin is in contact with both low-e coatings. The second lite of glass can be positioned on the first lite of glass so that the edges are aligned.

After the second lite of glass is placed on top of the first lite of glass to create a stack in which the resin composition is sandwiched between the two lites of glass, a two sided roller press, or a pinch roller, can be used to apply pressure and squeeze out any air bubbles in the resin composition. The two sided roller also can compress the two lites of glass together so that a final resin thickness is obtained. In some embodiments, the final resin thickness should be approximately 2 mm, but may be in the range of from 1 mm to 4 or even 6 mm depending on desired characteristics. Reduced thickness of the coating generally results in the resin becoming "less" opaque when current is applied to the resin, resulting in glass that is somewhat translucent even when the circuit is fully loaded. Similarly, thicker coatings may result in the class becoming cloudy even when electricity is isolated from the glass such that the glass is not clear.

A curing step is then performed so that the resin composition cures and bonds the first lite to the second lite. Any suitable curing method can be used. In some embodiments, the stack is subjected to UV-light at a specific strength and for a specified duration in order to cure the resin composition. In some embodiments, the UV light is in the 300 to 400 nm range and the intensity is a minimum of 200 mw/cm$^2$. In some embodiments, the curing step can last for from 4 seconds to 30 seconds. After the curing step is complete, the first lite is bonded to the second lite and the resin has a cloudy, opaque or translucent appearance.

Upon completion of the curing step, electrical contacts can be positioned in the electric privacy glass for providing an electrical charge to the electric privacy glass. As noted above, the lites of glass can be notched prior to assembling the stack so that the contacts can be positioned in contact with the low-e coated side of the lite of glass. Varying types of connectors can be used depending on whether the electric privacy glass is intended for indoor or outdoor use.

Figure 2:
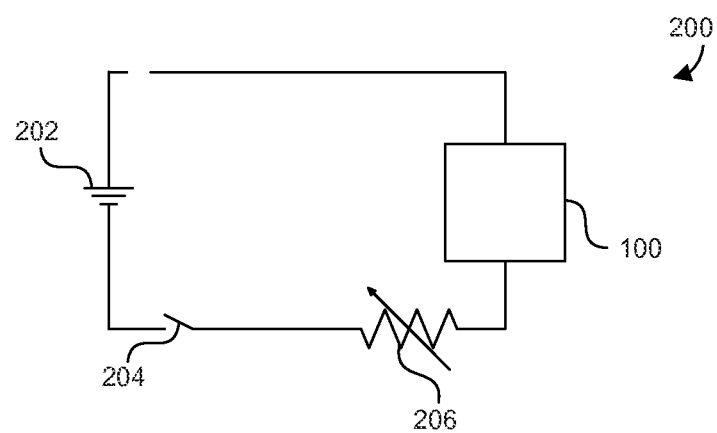
FIG. 2 is a schematic illustration of a control circuit for the privacy glass according to various embodiments described herein.

Referring now to FIG. 2, a control circuit 200 is described that is exemplary of providing an electrical charge to the electric privacy glass 100 shown in FIG. 1. The control circuit 200 includes a power supply 202. The power supply 202 in the United States may be conventional grid power at approximately 120 VAC as is convention. Other regulated power is possible as well. The grid power supply may be provided through a transformer to establish the correct current/voltage for the specific composition of low-e glass and resin. For the exemplary embodiment described above, the power supply 202 typically is a 120 VAC power supply capable of providing at least 130 milliamps at 60 Hz. A switch 204 may be provided in the circuit to control the supply of electrical power to the electric privacy glass 100. The switch 204 may be a conventional wall switch, a motion detection switch, an audio switch, a remote or wireless switch, or the like as is generally known in the art. Additionally, as described above, the translucence of the electric privacy glass 100 may be controlled in certain embodiments by the use of a dimmer or potentiometer 206. Optionally, a processor may be used to control the switch 204 such that certain discrete section of the electric privacy glass may receive (or not receive) a charge. The processor also may control the level of the electrical charge such that the processor controls the translucence (from opaque to transparent). This provides the ability to incorporate designs, logos, shading, and the like in the electric privacy glass 100.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

The invention claimed is:

1. A resin comprising:
   an E-7 liquid crystal mixture; and
   a UV-curable acrylate polymer consisting of:
      an acrylate urethane oligomer;
      a high boiling point methacrylate;
      an acrylic acid; and
      a photocuring agent.

2. The resin recited in claim 1, wherein the resin comprises about 70% E-7 liquid crystal mixture and about 30% UV-curable acrylate polymer.

3. The resin as recited in claim 1, wherein the UV-curable acrylate polymer has a viscosity of a light gel.

4. An electric privacy glass comprising:
   a first lite of low-emissivity coated glass;
   a second lite of low emissivity coated glass; and
   a resin sandwiched between the first lite of low emissivity coated glass and the second lite of low emissivity coated glass, wherein the resin comprises:
      an E-7 liquid crystal mixture; and
      a UV-curable acrylate polymer consisting of:
         an acrylate urethane oligomer;
         a high boiling point methacrylate;
         an acrylic acid; and
         a photocuring agent.

5. The electric privacy glass as recited in claim 4, wherein the resin bonds to both the first lite of low emissivity coated glass and the second lite of low emissivity coated glass.

6. The electric privacy glass as recited in claim 5, wherein the resin bonds to both the first lite of low emissivity coated glass and the second lite of low emissivity coated glass by curing the resin with UV light.

7. The electric privacy glass as recited in claim 4, wherein the coated side of the first lite of low emissivity coated glass and the second lite of low emissivity coated glass contacts the resin sandwiched between the first and second lite.

8. The electric privacy glass as recited in claim 4, wherein the thickness of the resin layer sandwiched between the first and second lite is in the range of from 1 mm to 2 mm.

9. The electric privacy glass as recited in claim 4, further comprising electrical contacts connected to the first and second lite for supplying an electrical charge to the electric privacy glass.

10. The electric privacy glass as recited in claim 9, wherein the application of electric charge to the electric privacy glass results in a transition of the electric privacy glass between a translucent or opaque state to a transparent state.

* * * * *